United States Patent [19]

Kawabata et al.

[11] Patent Number: 4,947,310
[45] Date of Patent: Aug. 7, 1990

[54] PARALLEL OPERATING SYSTME FOR ALTERNATE CURRENT OUTPUT CONVERTERS

[75] Inventors: Takao Kawabata; Jyoji Kawai, both of Hyogo, Japan

[73] Assignee: Mitsubishi Denki Kabushiki Kaisha, Tokyo, Japan

[21] Appl. No.: 356,683

[22] Filed: May 25, 1989

[30] Foreign Application Priority Data

May 30, 1988 [JP] Japan ................ 63-133073

[51] Int. Cl.$^5$ ........................... H02M 7/5387
[52] U.S. Cl. ........................... 363/71; 307/58; 307/87
[58] Field of Search .............. 307/58, 82, 87; 363/55, 363/65, 71, 72

[56] References Cited

U.S. PATENT DOCUMENTS

| | | | |
|---|---|---|---|
| 3,675,037 | 7/1972 | hamilton | 307/51 |
| 4,276,590 | 6/1981 | Hansel et al. | 307/82 |
| 4,635,178 | 6/1987 | Greenhalgh | 363/65 |
| 4,677,535 | 6/1987 | Kawabata et al. | 363/65 |
| 4,819,121 | 4/1989 | Saito et al. | 307/87 |

Primary Examiner—William H. Beha, Jr.
Attorney, Agent, or Firm—Bernard, Rothwell & Brown

[57] ABSTRACT

A parallel operating system for A.C. output converters of high frequency PWM inverters of an instantaneous current valve control type is provided with a current minor loop for controlling the instantaneous value of the output current. The current of each inverter minor loop is adapted to be supplied with a command value from a voltage major loop and a command value corresponding to the load current to be borne by each converter derived from the load current, as the command value for the current to be output by the converter for maintaining the output voltage at a sine wave.

15 Claims, 6 Drawing Sheets

PARALLEL OPERATING SYSTME FOR ALTERNATE CURRENT OUTPUT CONVERTERS

BACKGROUND OF THE INVENTION

1. Field of the Invention

The present invention relates to a power supply system for parallel operation of a plurality of alternate current output converters, such as inverters, connected with a common load, for controlling balance of currents between converters.

2. Description of the Prior Art

Figure 1:
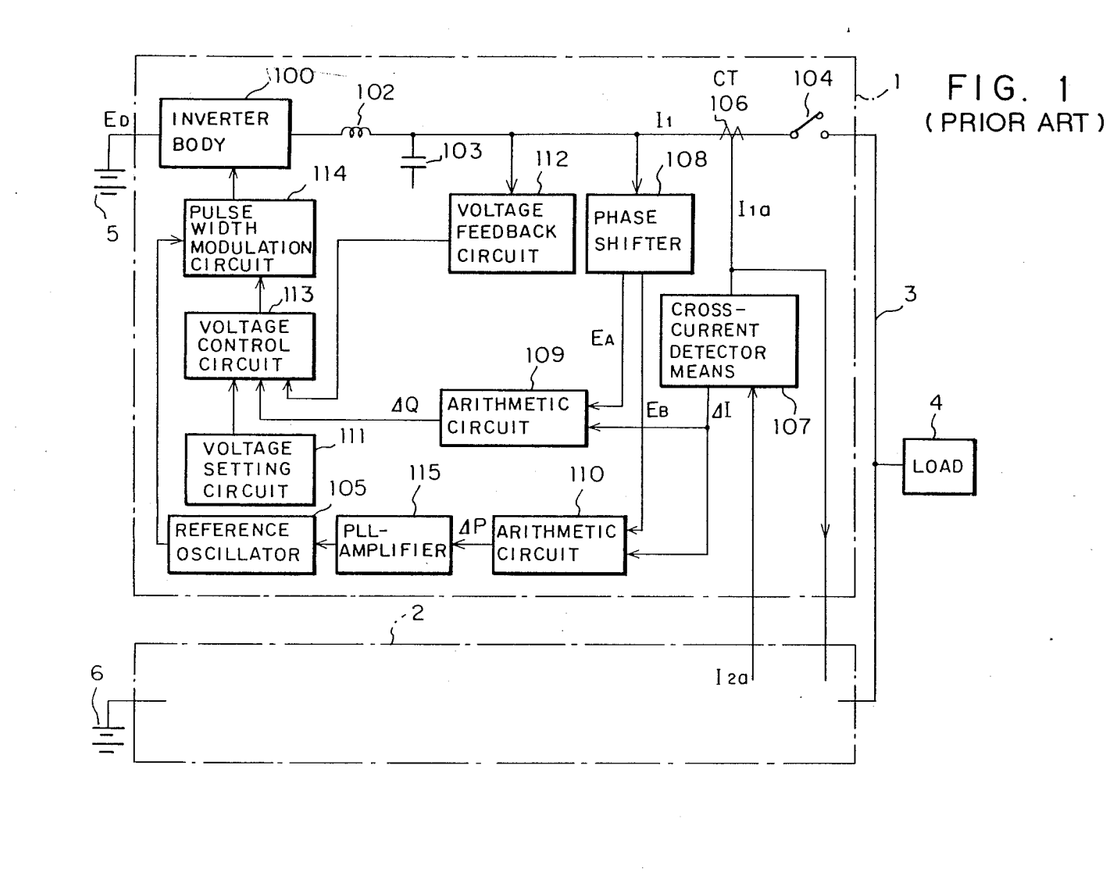
FIG. 1 is a block diagram showing a prior art parallel operating system for A.C. output converters.

FIG. 1 is a diagram showing a prior art parallel operating system for A.C. output converters as disclosed, for example, in Japanese Patent Publications No. 53-36137 and 56-1310.

Referring to the diagram, a first inverter 1 is operated in parallel with a second inverter 2 of the same structure connected through an output bus 3 for supplying power to a load 4. The first inverter 1 is structured chiefly of an inverter body 100, a filter reactor 102, and a filter capacitor 103, connected with the output bus 3 through an output switch 104, and is adapted to convert power from a D.C. power source 5 into A.C. power. In order to achieve parallel operation of the inverters 1 and 2, a detected signal $I_{1a}$ is first obtained by a current transformer CT 106 from the output current $I_1$ of the first inverter 1. Then, a difference signal I between a detected signal $I_{2a}$ similarly obtained from the second inverter 2 and the detected signal $I_{1a}$, corresponding to the cross current is obtained by a cross-current detector means 107. Thereupon, two voltage vectors $E_A$ and $E_B$ crossing each other at right angles are formed by a phase shifter 108, and these and the signal $\Delta I$ are operated upon in arithmetic circuits 109 and 110 and a reactive power component $\Delta Q$ and an effective power component $\Delta P$ are obtained, respectively. The inverter performs a pulse width modulation (PWM) for the inverter body 100 by means of a voltage control circuit 113 and a pulse width modulation circuit 114 based on output signals from a voltage setting circuit 111 and a voltage feedback circuit 112 and thereby controls the internal produced voltage.

Meanwhile, the reactive power component $\Delta Q$ is supplied to the voltage control circuit 113 as an auxiliary. The voltage control circuit 113, in response thereto, adjusts the internal produced voltage of the inverter body 100 several % thereby reducing the reactive power component $\Delta Q$ to zero.

On the other hand, the effective power component $\Delta P$ is supplied through an amplifier 115 forming a PLL circuit to a reference oscillator 105 to finely adjust its frequency, and hence, the amplifier 115 and the reference oscillator 105 function so as to control the phase of the internal produced voltage of the inverter body 100 thereby reducing the component $\Delta P$ to zero.

Thus, by controlling the voltage and phase to reduce $\Delta Q$ and $\Delta P$ to zero, the cross current between two inverters are eliminated and stabilized sharing of the load between them is attained.

However, there have been problems with the above described prior art system as follows. A first problem is that, when one of the inverters in parallel operation is faulty and thereby the output voltage becomes extremely low or high, it is possible for an excessive cross-current flow through another functioning inverter and thereby the functioning inverter also breaks down.

A second problem is that, since average values of the phase and the voltage of the internal produced voltage of the inverter are controlled to control the current for the load shared between the inverters, the allotted share of the current being thus controlled indirectly, it is difficult to improve the responding speed or accuracy of the controlling operation, and especially, it is impossible to control instantaneous allotment of the current.

A third problem is that the control of the effective current and that of the reactive current are not performed independently but they interfere with each other, and to avoid this interference, the response speed of the control cannot be raised so much.

A fourth problem is that, in a three phase system, when the reactance values of the reactors of the filters of the three phases are not equal but different from each other, the ratios of the allotted currents become different between phases.

The prior art parallel operating system for converters has been structured as described above and involves those problems as mentioned above, of which, it has been a primary problem that, when a breakdown occurs on one of the inverters in parallel operation and thereby the voltage on the broken inverter becomes extremely low or high, an excessive cross-current flows through another normal inverter and thereby this normal inverter also gets out of order.

SUMMARY OF THE INVENTION

The present invention has been made to solve the above mentioned problems.

An object of the present invention is to provide a parallel operating system in which, even if a breakdown is caused on a converter of a plurality of converters in parallel operation, no adverse effect due to an excessive cross-current will be produced on other normally operating converters in parallel operation.

Another object of the present invention is to provide a parallel operating system achieving high speed controlling of the load current shared among a plurality of converters in parallel operation and further capable of controlling instantaneous allotment of the current.

A further object of the present invention is to provide a parallel operating system capable of preventing interference between the effective current and the reactive current thereby improving the response speed of control.

Yet another object of the present invention is to provide a parallel operating system whereby it is made possible to make the ratios of the load current shared among a plurality of converters in parallel operation, equal to each other with the capacity of each converter taken into account.

A still further object of the present invention is to provide a parallel operating system not only applicable to parallel operation of inverters but also generally applicable to parallel operation of other converters of an instantaneously controlled type.

The parallel operating system for A.C. output converters according to the present invention is not of an average value control but of a high frequency PWM instantaneous value control, and moreover, it is structured based on inverters of an instantaneous current value control type provided with a current minor loop for controlling the instantaneous value of the output current. The current minor loop is adapted to be supplied with a command value from a voltage major loop and a command value obtained from the load current which corresponds to the share of the load current to be borne by each converter, as the command value for the current to be output by the converter for maintaining the output voltage at a sine wave.

The parallel operating system for A.C. output converters of the present invention, while maintaining a sine-wave bus voltage by means of its current minor loop controlling the instantaneous value of the output current of the converter, provides, as the command value to the minor loop, the command value from the voltage major loop and the command value corresponding to the share of the load current to be borne by each converter, thereby restraining occurrence of the cross current in the event of a breakdown caused on another converter.

The above and other objects and features of novelty of the invention will become more fully apparent from the following detailed description taken in conjunction with the accompanying drawings, which are solely for illustration and description and not for limiting the scope of the present invention.

BRIEF DESCRIPTION OF THE DRAWINGS

FIG. 7 is a circuit diagram showing a high-frequency inverter according to another embodiment of the present invention.

DETAILED DESCRIPTION OF THE PREFERRED EMBODIMENTS

An embodiment of the present invention will be described below with reference to the accompanying drawings.

Figure 2:
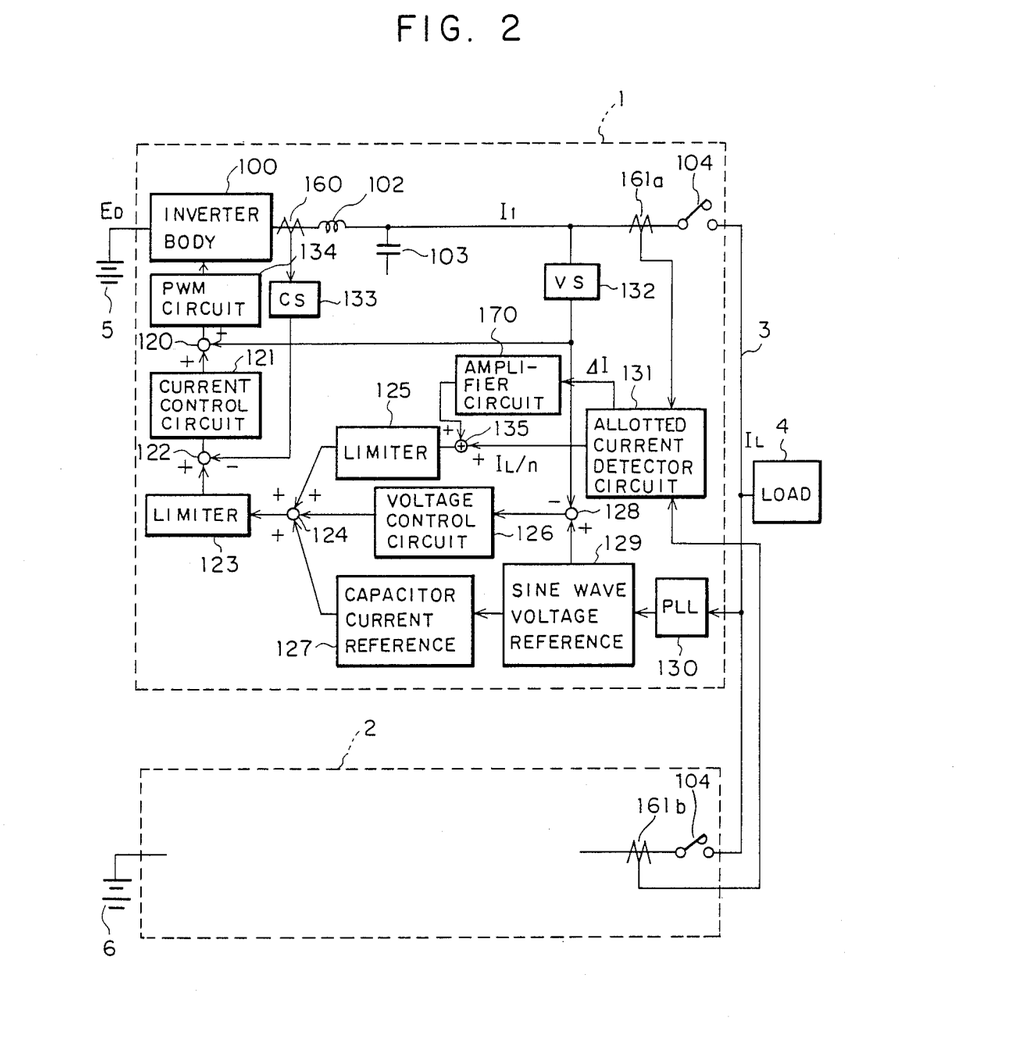
FIG. 2 and FIG. 3 are block diagrams showing a parallel operating system for A.C. output converters according to an embodiment of the present invention.

FIG. 2 is a block diagram showing a parallel operating system for A.C. output converters according to an embodiment of the present invention. Referring to the figure, a first inverter 1 is in parallel operation with a second inverter 2 of the same structure, not shown, through an output bus 3 for supplying power to a load 4. Parts in FIG. 2 corresponding to those in FIG. 1 are denoted by corresponding reference numerals. However, while FIG. 1 shows an inverter of the type controlling the average value of the output voltage, FIG. 2 shows an inverter of the type controlling instantaneous values of the output current and voltage, and hence, the circuits are not of the same function.

Figure 4A:
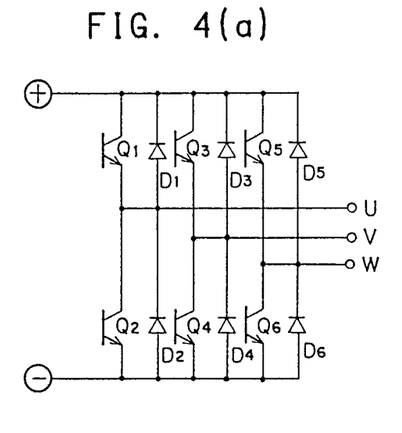
FIGS. 4(a) and (b) and FIG. 7 are circuit diagrams showing an embodiment of a converter for use in a system of the present invention.
Figure 4B:
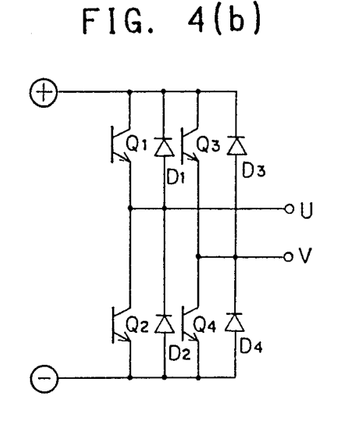

The inverter body 100 is formed, for example, of transistors or power MOSFETs capable of high-frequency switching, and allows each arm of a three-phase bridge inverter as shown in FIG. 4(a) or a single-phase bridge inverter as shown in FIG. 4(b) to switch at a high frequency as high as 10 times to several hundred times the output frequency (e.g., 60 Hz). While the timing of the switching is determined by PWM circuit 134, this PWM circuit, for example, is a sine wave/triangular wave comparison PWM circuit performing the switching at each intersection of a triangular carrier wave and an output voltage command signal.

The present inverter provides a current minor loop, and therein, a current control circuit 121 delivers a control signal to PWM circuit 134 so that the output current fed back through a CT 160 and a current sensor 133 may coincide with a current command from a limiter 123. Since there are voltages of counter-electromotive force from a capacitor 103 and the second inverter 2 on the output bus 3, the inverter body 100, in order to control the output current, is required to produce the sum of the voltages of counter-electromotive force and the voltage to be applied to a reactor 102. Hence, the output bus voltage is detected by a voltage sensor VS 132 and added to the output of the current control circuit 121. By so doing, the current control circuit 121 is only required to control the voltage applied to the reactor 102, and thereby, its controlling performance is enhanced. Meanwhile, a PLL 130 produces a sine wave voltage reference 129 in synchronism with the voltage on the output bus 3. A capacitor current reference 127 produces a reference sine wave current leading the voltage reference by 90° as the current to flow through the capacitor 103, corresponding to the capacitance of the capacitor 103. An allotted current detector circuit 131 derives, from the current in the first inverter detected by a CT 161a and the current in the second inverter detected by CT 161b, the instantaneous value of the current to be borne by each inverter, $I_L/n$, e.g., the load current $I_L$ divided by the number n of inverters in parallel (n=2 in the present case).

If the converters are of different capacity, and hence the current to be allotted is not 1/n of the load current, a current value corresponding to a different ratio of allotted currents is derived according to the capacity of the inverters.

A voltage control circuit 126 produces a correction current signal for the inverter to correct the discrepancy between the output voltage and the sine wave voltage reference 129.

Now, operations will be described. First, in the no-load state, the inverter supplies the current to flow through the capacitor 103 and thereby a no-load voltage is established. At this time, the voltage control circuit 126 corrects for the voltage error occurring due to the error in the current control or the discrepancy between the actual current value through the capacitor 103 and the capacitor current reference 127.

At this time, the output voltages of the two inverters are both controlled by their PLL 130 to be put in phase with the output bus 3 and they are put in parallel operation.

Upon turning on of the load 4, a command is issued from the allotted current detector circuit 131 to the current minor loop to bear ½ of the load current $I_L$ whereby each inverter bears a ½ share of the load current $I_L$. Here, a limiter 125 limits the overcurrent such as a rush current so as not to continue upon the turning on of the load and a limiter 123 limits the final current command value to below the allowable value for the inverter.

By arranging the parallel operating system as described above, the inverter is protected from an overcurrent by means of its own current minor loop and enabled to maintain the output voltage at a sine wave by quickly responding to distortions or sudden changes in the load current. What is characteristic of this system is that the control as described above is performed at each switching timing in the high-frequency PWM and therefore very quick response is attained. When a switching frequency of 10 KHz is used, for example, the control is performed every 100 μs, and therefore, a transient phenomenon due to an external disturbance such as a sudden change in the load can be completed within about 10 times of 100 μs, whereby excellent controlling performance can be obtained.

Although it is well known, a concrete example of the allotted current detection will be described below with reference to FIG. 5. Let us consider the case where a load current of 300 A is borne as $I_1 = 90$ A, $I_2 = 100$ A, and $I_3 = 110$ A by three inverters, INV-1, INV-2, and INV-3, respectively, and there are produced voltages of 9 V, 10 V, and 11 V respectively across the burden resistors $R_{11}$, $R_{21}$, and $R_{31}$ for the CT-1, CT-2, and CT-3. Across each of resistors $R_{12}$, $R_{22}$, and $R_{32}$ which are sufficiently larger than the resistors $R_{11}$, etc., there is developed $(9+10+11)/3 = 10$ V. This voltage corresponds to $\frac{1}{3}$ of the load current and the current value to be borne by each inverter, and hence, this signal being insulated can be introduced into the control circuit. In the foregoing description, it was neglected that the currents are vector quantities for simplicity's sake, but the same relationship holds if they are dealt with as vector quantities.

When, the INV-1, for example, is to be stopped, first a switch $S_{11}$ is shorted, whereupon the voltage on the resistors $R_{22}$ and $R_{32}$ each becomes 15 V and the load comes to be borne wholly by the other two inverters. Then, a switch $S_{12}$ is turned on and simultaneously the output switch for the inverter is opened so that it is released from the parallel connection.

Figure 5:
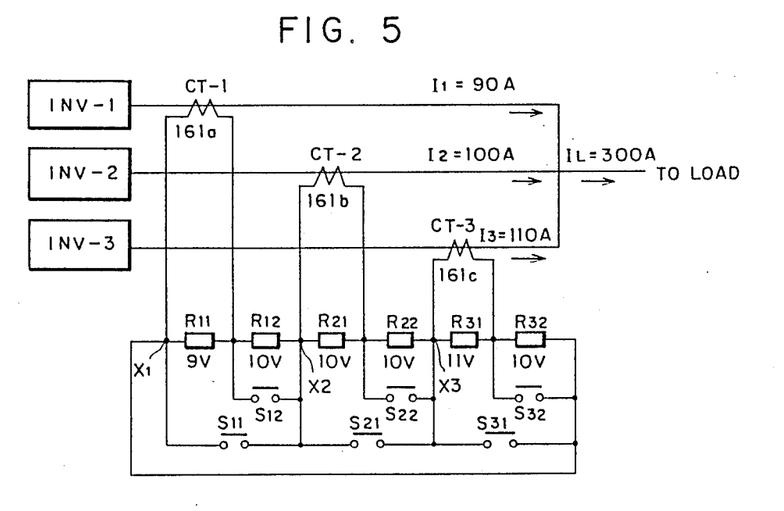
FIG. 5 is a circuit diagram of a circuit for detecting a load current to be allotted in the parallel operating system of FIG. 2.
Figure 6:
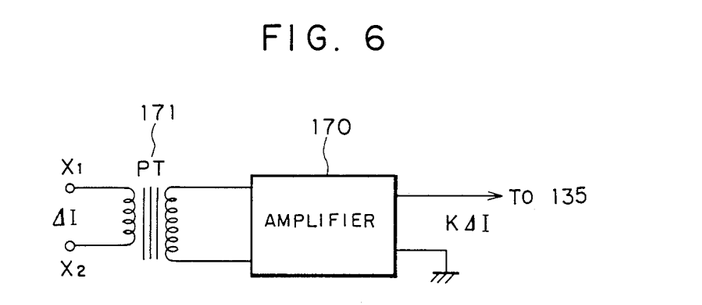
FIG. 6 is a circuit diagram of a circuit for more precise control of the current to be allotted in FIG. 5.

In the circuit of FIG. 5, for example across the resistor $R_{11}$, there is obtained a signal corresponding to the current being borne by the INV-1, and across the resistor $R_{12}$, there is obtained a signal corresponding to the current to be borne by the INV-1. Further, between the point $X_1$ and the point $X_2$, there is obtained a voltage corresponding to the discrepancy ΔI of the current borne by the INV-1. Hence, by additionally providing a circuit, as shown in FIG. 6, for insulating and amplifying the signal ΔI between the points $X_1$ and $X_2$ and supplying the signal to an adder 135 in FIG. 2, the discrepancy of the borne current can be reduced further. It is apparent, when the gain in the circuit of FIG. 6 is raised further, that the balanced allotment of the load will be attained even if the circuit to supply the allotted current command from the allotted current detector circuit 131 in a feeding-forward manner in FIG. 2 is omitted. This idea can also be implemented for the embodiment of FIG. 3.

The above described control system of FIG. 2 is applicable to both single-phase inverters and three-phase inverters, and, not only applicable to inverters, it is widely applicable to other instantaneously controllable converters such as cycloconverters as well.

A system using a synchronous rotating coordinate system with d-q axes, which provides more excellent characteristics in operating three-phase inverters or converters, will be described below with reference to FIG. 3.

Figure 3:
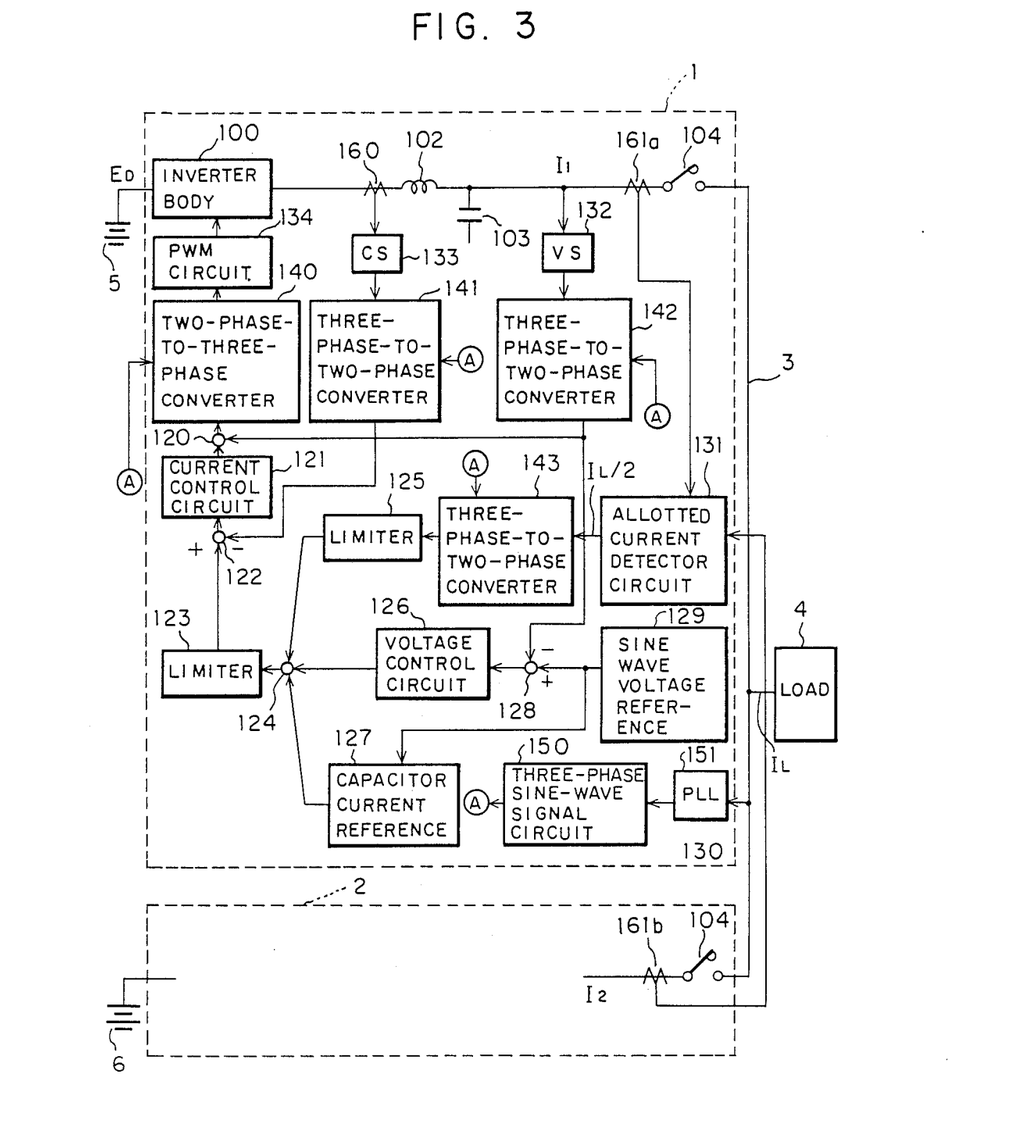

The configuration in FIG. 3 is virtually the same as that in FIG. 2 but greatly differs therefrom in that it has three three-phase-to-phase converters 141, 142, 143 and one two-phase-to-three-phase converter 140. A three-phase sine-wave signal circuit 150 and a PLL 151 synchronizing the circuit with the output bus voltage produce the following six signals as three-phase sinewave signals as the references for the pertinent coordinate transformation.

$$S_U = \sqrt{2/3} \sin(\omega t + \psi) \\ S_V = \sqrt{2/3} \sin(\omega t - 2\pi/3 + \psi) \\ S_W = \sqrt{2/3} \sin(\omega t + 2\pi/3 + \psi) \quad (1)$$

$$C_U = \sqrt{2/3} \cos(\omega t + \psi) \\ C_V = \sqrt{2/3} \cos(\omega t - 2\pi/3 + \psi) \\ C_W = \sqrt{2/3} \cos(\omega t + 2\pi/3 + \psi) \quad (2)$$

(where $\psi$ is usually set to $\psi = 0$).

When three-phase signals of the current sensor 133, the allotted current detector circuit 131, and the voltage sensor 132 are represented by the expression $\overline{X} = \text{col}[X_U, X_V, X_W]$, by multiplying the following transformation matrix $\overline{C}$ to the same, these are converted into the D.C. signals $\hat{Y} = \text{col}[Y_d, Y_q]$ along d-q axes as follows.

$$\overline{C} = \begin{bmatrix} S_U & S_V & S_W \\ C_U & C_V & C_W \end{bmatrix} \quad (3)$$

$$\hat{Y} = \begin{bmatrix} Y_d \\ Y_q \end{bmatrix} = \overline{C}\,\overline{X} = \begin{bmatrix} S_U & S_V & S_W \\ C_U & C_V & C_W \end{bmatrix} \begin{bmatrix} X_U \\ X_V \\ X_W \end{bmatrix} \quad (4)$$

where — above character indicates a matrix and ^ indicates vector quantities along d-q axes. Upon such transformation, if the inverter output voltage commands are expressed as $$\overline{V}_c^* = \sqrt{2}\,E \begin{bmatrix} \sin \omega t \\ \sin(\omega t - 2\pi/3) \\ \sin(\omega t + 2\pi/3) \end{bmatrix} \quad (5)$$

their values along the d-q axes are given by $$\hat{V}_c^* = \begin{bmatrix} V_{cd}^* \\ V_{cq}^* \end{bmatrix} = \overline{C}\,\overline{V}_c^* = \begin{bmatrix} \sqrt{3}\,E \\ 0 \end{bmatrix} \quad (6)$$

Further, when the capacitance of the capacitor 103 is denoted by $C_p$, the current commands $\hat{I}_c^*$ for the currents to be passed therethrough will be expressed as $$\hat{I}_c^* = \begin{bmatrix} V_{cd}^* \\ V_{cq}^* \end{bmatrix} = \overline{C}\,\overline{I}_c^* = \overline{C}\sqrt{2}\,\omega\,C_p\,E$$

$$\begin{bmatrix} \cos \omega t \\ \cos (\omega t - 2\pi/3) \\ \cos (\omega t + 2\pi/3) \end{bmatrix} = \begin{bmatrix} 0 \\ \sqrt{3} \; \omega \, C_P E \end{bmatrix} \quad (7)$$

Thus, a three-phase sine-wave signal becomes a D.C. constant along d-q axes. As against the control of the three-phase system of U-, V-, and W-phases of FIG. 2 in which errors are liable to be produced even in the normal state because of it being a variable value control system, control essentially producing smaller errors can be attained in the present control system being a constant value control system.

When the ordinary sine-wave triangular-wave comparison system is to be used for the PWM modulation, signals therefor of the three-phase, U-, V-, and W-phase, system become necessary. Hence, the following inverse transformation matrix (8) is multiplied by the control signals to thereby return them to the three-phase system again and the signals are supplied to the PWM circuit.

$$\overline{C}^{-1} = \begin{bmatrix} S_U & C_U \\ S_V & C_V \\ S_W & C_W \end{bmatrix} \quad (8)$$

In the above described embodiments based on FIG. 2 and FIG. 3, the controlling capability is designed to be improved by supplying, as the command value for the current minor loop, the current value to be passed through the parallel capacitor in the inverter output filter, but the capacitor current reference 127 in FIG. 2 and FIG. 3 may be omitted. This is because the voltage control circuit 126 functions so that the output voltage may coincide with the sine-wave voltage reference 129, and as a result, it produces a signal substituting for the signal of the capacitor current reference 127, thereby smoothly functioning as a control system for the sine-wave inverter. In such a case, a sufficiently large amplification factor of the voltage control circuit 126 reduces the discrepancy in the voltage control.

Figure 7:
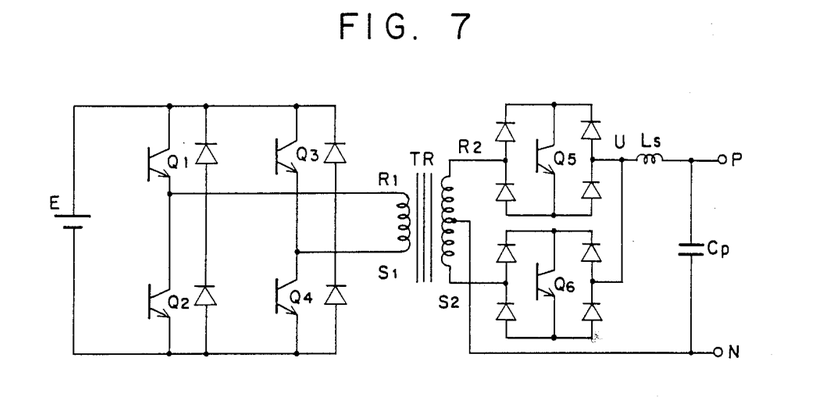

Although, in the above description, the case where the present invention was used for parallel operation of inverters was explained, the same principle can be applied to other instantaneously controllable current converters, such as a high-frequency link converter as shown in FIG. 7 comprised of a combination of high-frequency inverters and cycloconverters, in which D.C. power is converted to a high-frequency rectangular wave and further to a low-frequency sine wave.

Figure 8A:
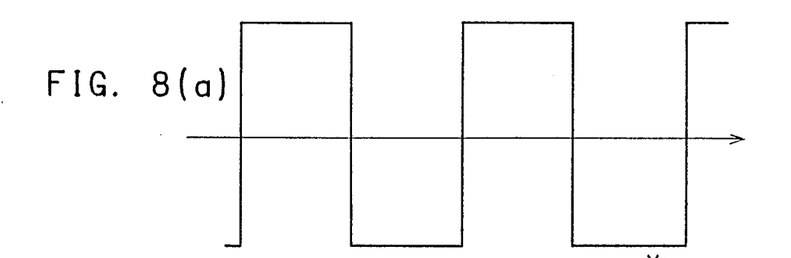
FIGS. 8(a) to (e) is diagram for explaining a high frequency link converter.
Figure 8B:
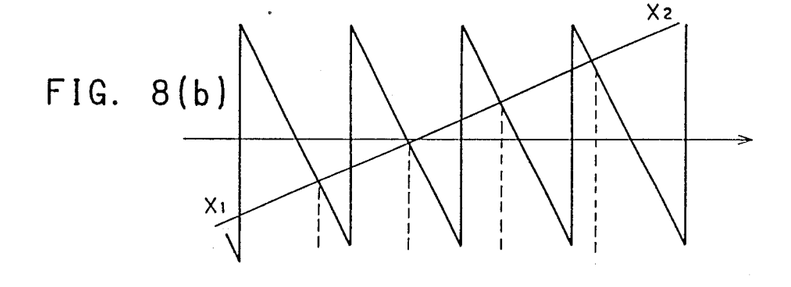
Figure 8C:
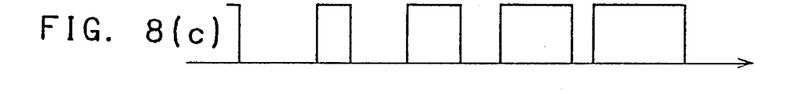
Figure 8D:
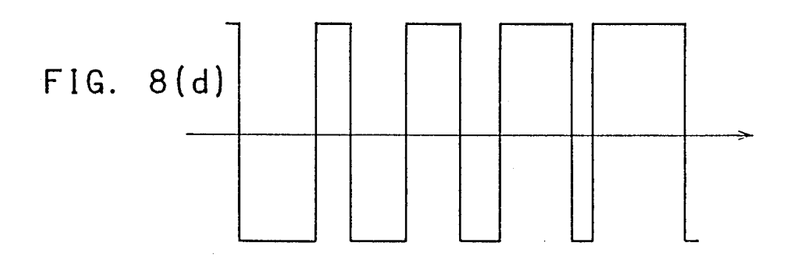
Figure 8E:
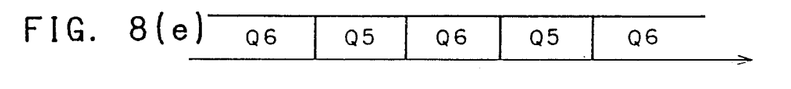

In the converters shown in FIG. 7, a rectangular wave as shown in FIG. 8(a) is obtained by switching of transistors Q1 to Q4 at the secondary side of the transformer Tr. Then, a sawtooth wave synchronized with switching of the inverter as shown in FIG. 8(b) is produced, and intersections of the same with the output voltage command signal as indicated by the line $X_1$-$X_2$ in the figure are obtained as shown in FIG. 8(c). Then, by selecting switches of the cycloconverter as indicated in FIG. 8(e) depending on the polarity of this signal and the voltage RS of the inverter, the voltage corresponding to the signal $X_1$-$X_2$ as shown in FIG. 8(d) is obtained between N and P in FIG. 7.

As apparent from the above explanation, the circuit of FIG. 7 is able to obtain a single phase PWM voltage equivalent to that from FIG. 4(b). Further, in the case of providing three-phase output, such a three-phase high-frequency link converter which uses three sets of the secondary side of the transformer TR of FIG. 7 may be used. The principle shown in FIG. 2 and FIG. 3 may be implemented by a discrete circuit including an analog operational amplifier, etc., or by a software treatment by digital control using a microprocessor or a digital signal processor.

Although explanation was given above with two inverters of the same capacity used for the sake of brevity, the invention can also be applied to parallel operation of n converters of different capacities. In such a case, each of the converters will be enabled to bear its share of the load in proportion to its capacity by arranging such that the CT-1, CT-2, CT-3, etc. and the resistors $R_{11}$, $R_{21}$, $R_{31}$, etc. are changed according to the capacities and the same voltages appear at the terminals across $R_{11}$, $R_{21}$, $R_{31}$, etc. when the rated current flows.

Although two limiters 123 and 125 are used in the embodiments of FIG. 2 and FIG. 3, the limiter 125 may be omitted only leaving the limiter 123, or, even if neither of the limiters 123 and 125 is used, the saturation limit of the amplifier may be used for the limiter.

As understood from the above description, the present parallel operating system has the following features. First, the output current of the converter is restricted by the command value issued to the current minor loop, and therefore, even if the output of another converter suddenly changes due to its breakdown or the like, there is no possibility of a breakdown of the sound converter due to a cross current passing through this sound converter. Secondly, since the instantaneous value of the output current of the converter is directly controlled in the present system, a quick response to the allotted current and precise control of it is possible. Provided that the switching frequency of the converter is sufficiently high, excellent control of allotted current can be performed, even during a transient phenomenon, because the allotted current can be instantaneously controlled in the interval of the switching period. Thirdly, in the case of three-phase operations, a control system can be set up along d-q axes to thereby obtain a non-interactive control system capable of quick-response control along both the d axis and the q axis. Fourthly, since the value $L_S$ of the output filter is included in the current minor loop, even if the values are not equal among three phases the discrepancy can be compensated for.

The present invention having many features as mentioned above is adapted to obtain a sine-wave voltage while performing parallel operation of converters with a current minor loop controlling the instantaneous value of the output current, and therefore it produces the effect to restrict overcurrents such as a rush current from the load or a cross current due to a voltage change in another converter due to its sudden breakage. Thus, a highly reliable system can be structured.

What is claimed is:

1. In a parallel converter system for operating a plurality of sine-wave converters in parallel, each thereof including a filter, with outputs thereof connected to a common bus and a share of a load current allotted to each, said parallel operating system for alternate current converters comprising, for each converter:
   a converter body executing conversion of an instantaneous current control type by means of an arm of each phase constituting the converter body performing a plurality of switching operations during one cycle time to thereby control an instantaneous value of an output current;

means for establishing a sine-wave output voltage reference synchronized with a load bus voltage;

means for determining a share of a load current to be borne by each converter based on a detected value of the load current and providing a first signal corresponding to said determined value; and voltage control means for detecting an error between the load bus voltage and said sine-wave output voltage reference and providing a second signal for correcting said error, wherein a sum of said first signal and second signal is provided as a current command value for said converter.

2. A parallel operating system for alternate current output converters according to claim 1, further comprising capacitor current reference setting means for setting a current value derived from said sine-wave output voltage reference as a value of a current to be passed through a parallel capacitor of a filter of said converter corresponding to a capacitance of the parallel capacitor and issuing the determined value as a current command value, wherein said current command value and the sum of said first and second signals are added together to thereby provide a synthesized current command value.

3. A parallel operating system for alternate current output converters according to claim 1, wherein the converter body of said converter is constituted of elements capable of high-frequency switching.

4. A parallel operating system for alternate current output converters according to claim 1, wherein said converter has a current minor loop including the converter body, a PWM circuit, a voltage sensor, and a current sensor.

5. A parallel operating system for alternate current output converters according to claim 1, wherein said converter includes a first limiter for limiting overcurrents such as a rush current at the time of connection of the load so as not to continue and a second limiter for limiting the final current command value to less than an allowable value for the inverter.

6. In a parallel converter system for operating a plurality of sine-wave three-phase converters in parallel, each thereof including a three-phase filter, with outputs thereof connected to a three-phase common bus and a share of a load current allotted to each, said parallel operating system for alternate current converters comprising, for each converter:

a three-phase converter body executing conversion of an instantaneous current control type by means of an arm of each phase constituting the converter body performing a plurality of switching operations during one cycle time to thereby control an instantaneous value of an output current;

means for establishing a three-phase sine—wave output voltage reference synchronized with a load bus voltage;

means for determining a share of a three-phase load current to be borne by each converter based on a detected value of the load current and, providing a first three-phase signal corresponding to said determined value; and voltage control means for detecting an error between the three-phase load bus voltage and said three-phase sine-wave output voltage reference and providing a second three-phase signal for correcting said error, wherein a sum of said first three-phase signal and second three-phase signal is provided as a three-phase current command value for said converter.

7. A parallel operating system for alternate current output converters according to claim 6, further comprising three-phase capacitor current reference setting means for setting a three-phase current value derived from said three-phase sine-wave output voltage reference as a value of a current to be passed through parallel capacitors of said three-phase filter of said converter corresponding to a capacitance of the parallel capacitors and issuing the three-phase determined value as a current command value, wherein said current command value and the sum of said first and second three-phase signals are added together to thereby provide a synthesized three-phase current command value.

8. A parallel operating system for alternate current output converters according to claim 6, wherein the three-phase converter body of said converter is constituted of elements capable of high-frequency switching.

9. A parallel operating system for alternate current output converters according to claim 6, wherein said converter has a current minor loops including the converter body, a three-phase PWM circuit, a three-phase voltage sensor, and a three-phase current sensor.

10. A parallel operating system for alternate current output converters according to claim 6, wherein said converter includes a three-phase first limiter for limiting overcurrents such as a rush current at the time of starting of the load so as not to continue and a three-phase second limiter for limiting the final current command value to less than an allowable value for the inverter.

11. In a parallel converter system for operating a plurality of sine-wave three-phase converters in parallel, each thereof including a filter, with the converters connected to a common bus and a share of a load current allotted to each, said parallel operating system for alternate current converters comprising, for each converter:

a converter body executing conversion of an instantaneous current control type by means of an arm of each phase constituting the converter body performing a plurality of switching operations during one cycle time to thereby control an instantaneous value of the output current;

means for providing a three-phase sine-wave signal synchronized with a load bus voltage;

means for determining a share of a load current to be borne by each converter based on a detected value of the load current and providing a first signal corresponding to a determined value;

means using said three-phase sine-wave signal synchronized with said load bus voltage for converting each of said load bus voltage and said first signal into two components along d axis and q axis constituting a synchronous rotating coordinate;

means for establishing a reference of a component along the d axis of the output voltage and a reference of the component along a q axis; and voltage control means for detecting errors between said output voltage references along said d axis and q axis and said load bus voltage components along the d axis and the q axis for providing a second signal for correcting said errors along both the d axis and the q axis; wherein a sum of said first and second signals is obtained along the d axis and the q axis and the sum is provided as a current command value along the d axis and the q axis for said converter.

12. A parallel operating system for alternate current output converters according to claim 11, further comprising capacitor current reference setting means for setting a current value derived from a sine-wave output voltage reference as a value of a current to be passed through a parallel capacitor of a filter of said converter corresponding to the capacitance of the parallel capacitor and issuing a determined value as a current command value, wherein said current command value and the sum of said first and second signals are added together to thereby provide a synthesized current command value.

13. A parallel operating system for alternate current output converters according to claim 11, wherein the converter body of said converter is constituted of elements capable of high-frequency switching.

14. A parallel operating system for alternate current output converters according to claim 11, wherein said converter has a current minor loop including the converter body, a three-phase PWM circuit, voltage sensors and current sensors.

15. A parallel operating system for alternate current output converters according to claim 11, wherein said converter includes a first limiter for limiting overcurrents such as a rush current at the time of starting of the load so as not to continue and a second limiter for limiting a final current command value to less than an allowable value for the inverter.

* * * * *

UNITED STATES PATENT AND TRADEMARK OFFICE
CERTIFICATE OF CORRECTION

PATENT NO. : 4,947,310

DATED : August 7, 1990

INVENTOR(S) : Takao Kawabata et al.

It is certified that error appears in the above-identified patent and that said Letters Patent is hereby corrected as shown below:

On the cover page and at the top of column 1, in the title, "SYSTME" should be --SYSTEM--.

Column 1, line 29, "I" should be --$I_\Delta$--.

Column 6, line 65, "$V_{cd}*$" should be --$I_{cd}*$--.

Column 8, line 22, "only leaving" should be --leaving only--.

Column 8, lines 32 and 34, "sound" should be --normal--.

Column 10, line 25, "loops" should be --loop--.

Signed and Sealed this

Twenty-eighth Day of April, 1992

Attest:

HARRY F. MANBECK, JR.

*Attesting Officer*  *Commissioner of Patents and Trademarks*